United States Patent
Koochin (12)

(10) Patent No.: US 6,339,981 B1
(45) Date of Patent: Jan. 22, 2002

(54) BRAKE ADJUSTMENT TOOL

(75) Inventor: Carey Andrew Koochin, Canal Flats (CA)

(73) Assignee: Koochin Trucking Ltd., Canal Flats (CA)

( * ) Notice: Subject to any disclaimer, the term of this patent is extended or adjusted under 35 U.S.C. 154(b) by 0 days.

(21) Appl. No.: 09/576,615

(22) Filed: May 24, 2000

(51) Int. Cl.[7] ................................................. B25F 1/00
(52) U.S. Cl. ...................... 81/437; 81/176.15; 81/124.4
(58) Field of Search ........................ 81/176.1, 176.15, 81/484, 437, 125.1, 124.4, 180.1, 461, 439, 451; 188/196 R

(56) References Cited

U.S. PATENT DOCUMENTS

| | | |
|---|---|---|
| 1,992,474 A | 2/1935 | Currier |
| 2,403,264 A | 7/1946 | Cormier |
| 2,497,789 A | 2/1950 | Mueller |
| 2,581,095 A * | 1/1952 | Godmaire .................... 81/437 |
| 2,643,566 A * | 6/1953 | Dos Santos .................. 81/437 |
| 2,681,791 A * | 6/1954 | Hahn .......................... 81/437 |
| 3,731,560 A | 5/1973 | Bares |
| 3,742,789 A | 7/1973 | Rusk et al. |
| 3,979,979 A * | 9/1976 | Grabovac ................. 81/121 R |
| 4,027,572 A | 6/1977 | Burge |
| 4,227,429 A | 10/1980 | Bowers, Jr. et al. |
| 4,459,716 A * | 7/1984 | Valadez ......................... 7/100 |
| 4,466,315 A | 8/1984 | Boschetto, Jr. et al. |
| 4,625,353 A | 12/1986 | Tamez et al. |
| 4,846,025 A | 7/1989 | Keller et al. |
| 4,982,629 A * | 1/1991 | Germain .................... 81/176.1 |
| 5,005,279 A | 4/1991 | Kooiker |
| 5,099,726 A * | 3/1992 | Hsiao .......................... 81/459 |
| 5,216,940 A * | 6/1993 | Hedden ..................... 81/177.2 |
| 5,570,619 A | 11/1996 | Boswick |
| 5,613,412 A | 3/1997 | Dawson |
| 5,724,872 A * | 3/1998 | Shih ............................. 81/125 |
| 5,819,691 A * | 10/1998 | Brannan ...................... 81/437 |
| 5,845,552 A * | 12/1998 | Piascik ........................ 81/461 |
| 5,862,725 A * | 1/1999 | Negus ......................... 81/461 |
| 6,095,017 A * | 8/2000 | Long ....................... 81/176.15 |

* cited by examiner

*Primary Examiner*—Robert J. Oberleitner
*Assistant Examiner*—Benjamin A. Pezzlo
(74) *Attorney, Agent, or Firm*—Bennett Jones LLP

(57) ABSTRACT

A tool is described for adjusting a slack adjuster. A slack adjuster includes an adjustment bolt and a sealing plate disposed about the adjustment bolt. The tool includes an end including a hex-shaped aperture for engaging the hex-shaped head of the adjustment bolt. The tool also includes an annular face including a pair of spaced apart pins for engaging the sealing plate. A hex is formed on the outer surface of the tool for engagement by a wrench.

5 Claims, 2 Drawing Sheets

BRAKE ADJUSTMENT TOOL

FIELD OF THE INVENTION

This invention is directed to a brake adjusting tool and, in particular, to a brake adjusting tool for adjusting the automatic slack adjuster of an air brake.

BACKGROUND OF THE INVENTION

Air brake systems for vehicles generally include a pneumatic actuator coupled by a crank to a shaft which moves a brake shoe against a brake drum of a wheel of the vehicle. The brake shoe is biased away from contact with the drum. When the brakes are applied, the pneumatic actuator moves a distance corresponding to the clearance between the shoe and the drum before braking begins. When the clearance is insufficiently close, dragging and overheating can occur in the brakes. When the clearance is excessive, an undesirable delay in brake application occurs and high pressure air is needed.

A slack adjuster is provided on each air brake for adjustment of the clearance between the shoe and the drum. The slack adjuster includes an adjustment bolt and, disposed about an exposed end of the bolt, a sealing plate. To properly adjust the clearance between the shoe and drum, the bolt must be turned and, occasionally, the sealing plate must be tightened down into the housing. While tightening the bolt will adjust the clearance, tightening the bolt without occasionally also tightening the sealing plate down about the bolt causes premature wear of gear teeth on the bolt and, therefore, premature failure of the slack adjuster. In particular, failure to tighten the sealing plate when tightening the adjustment bolt permits gear teeth on the bolt to only loosely mesh with a corresponding gear plate in the slack adjuster housing. This causes premature wear of the gear teeth. This problem is particularly important for fleet operators which are often forced to replace slack adjusters prematurely simply because the gear teeth of the adjustment teeth have worn.

The main reason for failure to tighten or loosen both the sealing plate and the adjustment bolt is lack of convenience. Tightening of both requires an assortment of wrenches. Further, the inconvenient positioning of the slack adjusters requires that when adjustment is required, a number of sockets must be carried under the vehicle. The slack adjuster on a semi-truck is located in a confined space of 4 to 5 inches and, therefore, only tools with a minimum size can be used. In particular, any useful tool can extend out from the slack adjuster no more than three inches and preferably no more than 2 inches.

In order to facilitate proper adjustment of air brake auto slack adjusters, a single tool is needed for adjusting both the sealing plate and the adjustment bolt of a slack adjuster.

SUMMARY OF THE INVENTION

A tool has been invented which is useful for adjusting both the sealing plate and the adjustment bolt of a slack adjuster. The adjustments can be made independently, as is required. The tool is of a small size to easily fit into the space about the slack adjuster.

In accordance with a broad aspect of the present invention, there is provided a tool for adjusting an automatic slack adjuster, the tool comprising: a body having an outer surface and a long axis extending between a first end and an opposite end, the first end including an annular face surrounding an opening, the annular face being coaxial with the long axis of the body and having a pair of diametrically opposed pins extending therefrom, the opposite end including an end face having formed therein a polygonal aperture, the polygonal aperture being positioned coaxially with the long axis of the body and the outer surface including a polygonal faceted region for engagement by a wrench, the polygonal faceted region being disposed about a centre axis positioned coaxially with the long axis of the body.

The tool is selected to adjust both the adjustment bolt and the sealing plate of a slack adjuster. In particular, the first end is formed to engage the sealing plate about the adjustment bolt of a slack adjuster while not engaging the adjustment bolt. The polygonal aperture at the opposite end is selected to engage the head of the slack adjuster adjustment bolt. The tool body can be rotated to transmit torque to either the adjustment bolt of the sealing plate by engaging the polygonal faceted region with a flat wrench.

The pins can be formed integral with the annular face or can be mounted on the annular face in a permanent or removable manner. In one embodiment, the pins are removably disposed in a pair of substantially parallel longitudinal bores formed diametrically opposed on the annular face. To permit for adjustment in the spacing of the pins, preferably a plurality of pairs of longitudinal bores are provided on the annular face for accepting the pins. Each of the pairs of longitudinal bores are diametrically opposed and each pair has a spacing therebetween different from each other pair.

In accordance with another broad aspect of the present invention, there is a method for adjusting an automatic slack adjuster including an adjustment bolt and a sealing plate disposed about the adjustment bolt, the method comprising: providing a tool including a body having an outer surface and a long axis extending between a first end and an opposite end, the first end including an annular face surrounding an opening, the annular face being coaxial with the long axis of the body and having a pair of diametrically opposed pins extending therefrom, the opposite end including an end face having formed therein a polygonal aperture, the polygonal aperture being selected to correspond to and engage the adjustment bolt's exposed head and being positioned coaxially with the long axis of the body and the outer surface including a polygonal faceted region for engagement by a wrench, the polygonal faceted region being disposed about a centre axis positioned coaxially with the long axis of the body; fitting the polygonal aperture over the adjustment bolt's exposed head; and rotating the tool to apply torque to the adjustment bolt.

BRIEF DESCRIPTION OF THE DRAWINGS

A further, detailed, description of the invention, briefly described above, will follow by reference to the following drawings of specific embodiments of the invention. These drawings depict only typical embodiments of the invention and are therefore not to be considered limiting of its scope. In the drawings.

DETAILED DESCRIPTION OF THE PRESENT INVENTION

Figure 1:
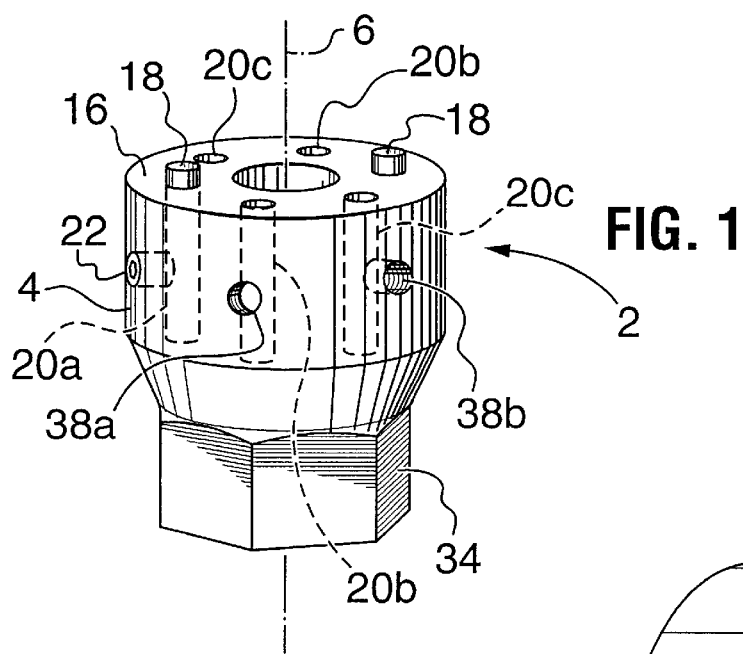
FIG. 1 is a side elevation of a tool according to the present invention.
Figure 2:
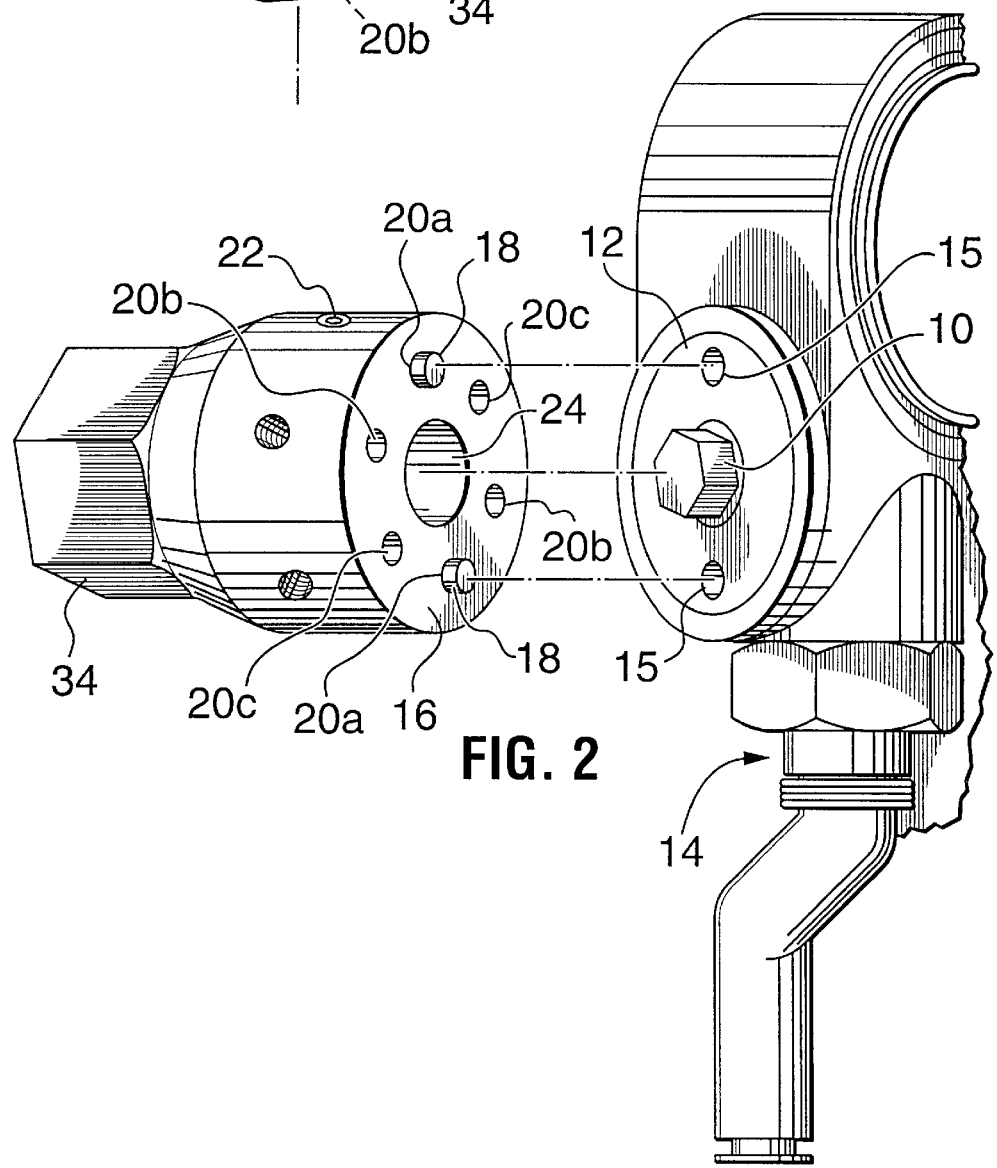
FIG. 2 is a perspective view of the first end of the tool of FIG. 1 aligned for adjustment of a slack adjuster.
Figure 3:
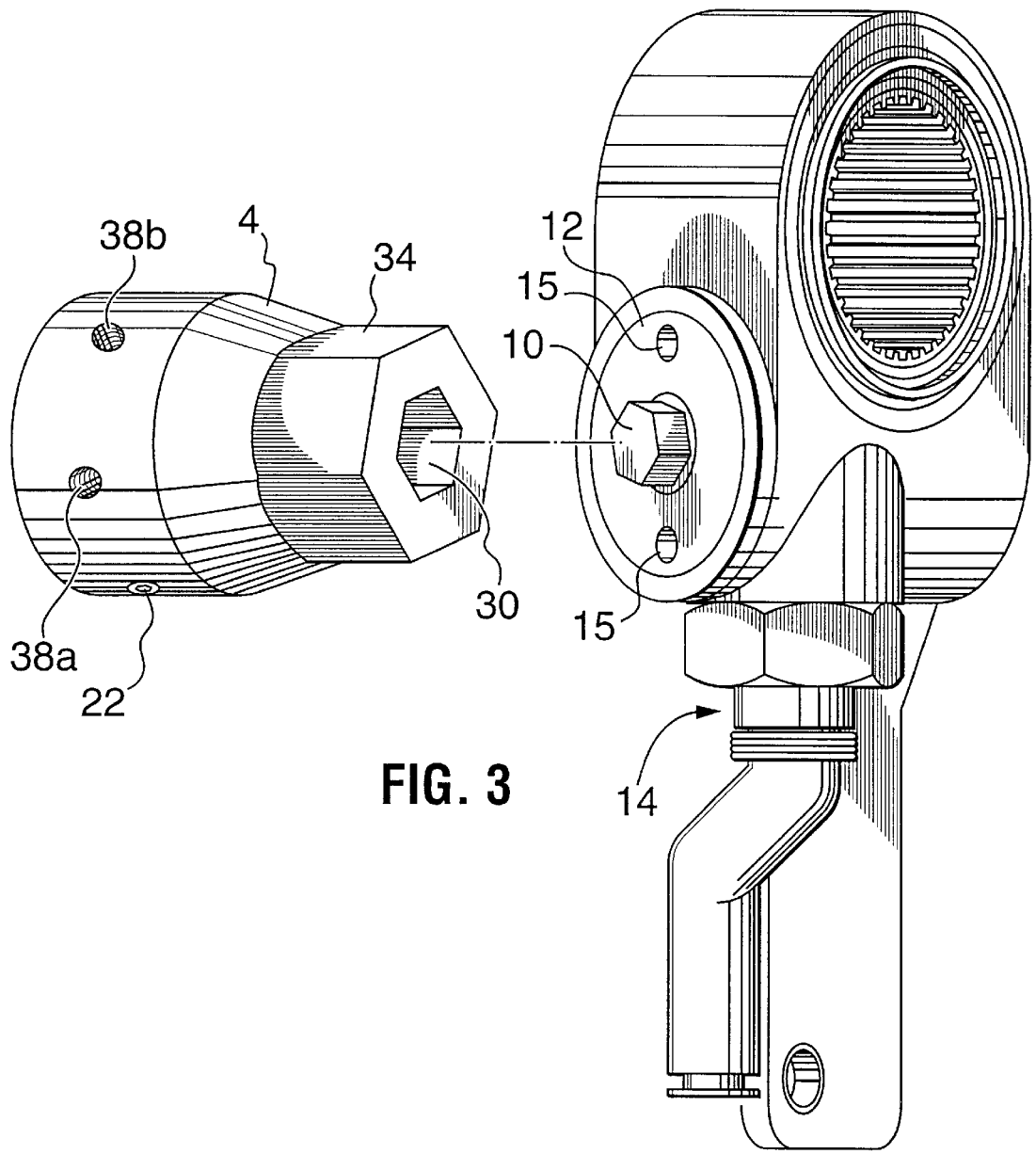
FIG. 3 is a perspective view of the opposite end of the tool of FIG. 1 aligned for adjustment of a slack adjuster.

Referring to the Figures, a tool 2 according to the present invention is shown. Tool 2 includes a body having an outer surface 4 and a longitudinal axis 6 extending between the ends of the body. The tool is useful for adjusting both the adjustment bolt 10 and sealing plate 12 of a slack adjuster 14.

One end of the body is formed to engage in the holes 15 of the sealing plate 12, without engaging adjustment bolt 10 and has an annular face 16 having a pair of pins 18 extending therefrom. Pins 18 are mounted in a diametrically opposed pair of bores 20a in the annular face. Pins 18 are maintained in the bores by set screws 22 inserted through threaded bores extending from outer surface 4 into bores 20a. In the centre of annular face 16 is an opening 24.

The opposite end of the tool is formed to engage the adjustment bolt in order to impart torque to it. The opposite end includes a polygonal aperture 30 formed to fit over and engage adjustment bolt 10. Generally, both polygonal aperture 30 and adjustment bolt 10 are hex-shaped.

A polygonal faceted region 34 is formed on outer surface 4. The polygonal faceted region is preferably formed as a hex to permit engagement by a regular flat wrench. Region 34 can be at any position along the body. Preferably, region 34 is adjacent the end having aperture 30, as shown, or between the ends, rather than at the pin end, to permit the region to be reduced to a more acceptable diameter. This reduces the weight and the size of both the tool and the wrench required to drive the tool.

The tool can be made of any durable material such as, for example, rolled steel.

In use, tool 2 can be used to tighten or loosen sealing plate 12. Pins 18 engage in holes 15 of sealing plate 12 while opening 24 fits over the exposed head of adjustment bolt. A wrench (not shown) is then placed in engagement with region 34 and is rotated to drive tool 2 to rotate. This, in turn, impart torque through pins 18 to the sealing plate to cause it to be moved into or drawn out of slack adjuster 14. Since it is desirable to adjust bolt 10 and plate 12 independently, opening 24 is selected to have a shape and/or diameter such that it can fit over and be rotated about the adjustment bolt without engaging it.

The spacing between holes 15 can vary in some slack adjusters. Thus, in a preferred embodiment, as shown, additional pairs of diametrically opposed bores 20b, 20c are provided. The spacing between each of the pairs of bores 20a, 20b, 20c is slightly different to permit the spacing between the pins to be adjusted to match the particular slack adjuster which is desired to be adjusted. Bores 20b, 20c include threaded bores 38a, 38b for accepting set screws 22. If desired, to reduce cost, the additional pairs of bores can be eliminated or only one additional pair of bores can be used.

The tool can then be turned to permit adjustment of adjustment bolt 10. To do this, aperture 30 is fit over the exposed head of adjustment bolt 10. A wrench is then placed in engagement with region 34 and is rotated to drive tool 10 to rotate. This, in turn, imparts torque through aperture 30 to the bolt 10 to cause it to be moved into or drawn out of slack adjuster 14.

As will be appreciated, the use of the present tool will facilitate slack adjuster adjustment since only the present tool and a flat wrench need be used and the minimal size of the tool facilitates use thereof in the tight space surrounding a slack adjuster.

It will be apparent that many other changes may be made to the illustrative embodiments, while falling within the scope of the invention and it is intended that all such changes be covered by the claims appended hereto.

The embodiments of the invention in which an exclusive property or privilege is claimed are defined as follows:

1. A tool for adjusting an automatic slack adjuster, the tool comprising:

a body having an outer surface and a long axis extending between a first end and an opposite end;

the first end including an annular face surrounding an opening, the annular face being coaxial with the long axis of the body and having a pair of diametrically opposed pins extending therefrom;

the opposite end including an end face having formed therein a polygonal aperture, the polygonal aperture being positioned coaxially with the long axis of the body; and the outer surface including a polygonal faceted region for engagement by a wrench, the polygonal faceted region being disposed about a centre axis positioned coaxially with the long axis of the body.

2. The tool of claim 1 wherein the pins are removably disposed in a pair of substantially parallel longitudinal bores formed in diametrically opposed position on the annular face.

3. The tool of claim 1 wherein a plurality of pairs of longitudinal bores are provided on the annular face for accepting the pins, each of the pairs of longitudinal bores are diametrically opposed and each pair has a spacing therebetween different from each other pair.

4. A method for adjusting an automatic slack adjuster including an adjustment bolt and a sealing plate disposed about the adjustment bolt, the method comprising:

providing a tool including a body having an outer surface and a long axis extending between a first end and an opposite end, the first end including an annular face surrounding an opening, the annular face being coaxial with the long axis of the body and having a pair of diametrically opposed pins extending therefrom, the opposite end including an end face having formed therein a polygonal aperture, the polygonal aperture being selected to correspond to and engage the adjustment bolt's exposed head and being positioned coaxially with the long axis of the body and the outer surface including a polygonal faceted region for engagement by a wrench, the polygonal faceted region being disposed about a centre axis positioned coaxially with the long axis of the body;

fitting the polygonal aperture over the adjustment bolt's exposed head; and rotating the tool to apply torque to the adjustment bolt.

5. The method of claim 4 comprising the further step of fitting the pair of diametrically opposed pins into the sealing plate's diametrically opposed holes and rotating the tool to apply torque or relieve pressure to the sealing plate.

* * * * *